US010909728B1

(12) United States Patent
Appalaraju et al.

(10) Patent No.: US 10,909,728 B1
(45) Date of Patent: Feb. 2, 2021

(54) LEARNED LOSSY IMAGE COMPRESSION CODEC

(71) Applicant: Amazon Technologies, Inc., Seattle, WA (US)

(72) Inventors: Srikar Appalaraju, Seattle, WA (US); R. Manmatha, San Francisco, CA (US); Yash Patel, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 16/400,900

(22) Filed: May 1, 2019

(51) Int. Cl.
*G06T 9/00* (2006.01)
*G06N 20/10* (2019.01)
*G06N 3/08* (2006.01)
*G06T 3/40* (2006.01)

(52) U.S. Cl.
CPC ............ *G06T 9/002* (2013.01); *G06N 3/084* (2013.01); *G06N 20/10* (2019.01); *G06T 3/40* (2013.01)

(58) Field of Classification Search
CPC ........... G06T 9/002; G06T 3/40; G06N 20/10; G06N 3/084
See application file for complete search history.

(56) References Cited

U.S. PATENT DOCUMENTS

| 2010/0046849 | A1* | 2/2010 | Wu | G06T 3/40 |
| | | | | 382/253 |
| 2017/0208335 | A1* | 7/2017 | Ramamurthy | H04N 19/164 |
| 2019/0171936 | A1* | 6/2019 | Karras | G06N 3/0454 |
| 2020/0304804 | A1* | 9/2020 | Habibian | H04N 19/31 |

OTHER PUBLICATIONS

Bellard F., "BPG Specification," BPG Image Format, Version 0.9.5, retrieved from https://bellard.org/bpg/bpg_spec.txt, 2014, 8 pages.
Bengio Y., et al., "Representation Learning: A Review and New Perspectives," IEEE transactions on Pattern Analysis and Machine Intelligence, vol. 35 (8), Aug. 2013, pp. 1798-1828.
Bruna J., et al., "Super-Resolution with Deep Convolutional Sufficient Statistics," Published as a conference paper at ICLR 2016, Nov. 2015, 18 pages.
Franzen R., "Kodak Lossless True Color Image Suite," retrieved from http://r0k.us/graphics/kodak/, Nov. 15, 1999, 3 pages.
Johnson J., et al., "Perceptual Losses for Real-Time Style Transfer and Super-Resolution," European Conference on Computer Vision, Springer, Mar. 2016, pp. 694-711.
Lim B., et al., "Enhanced Deep Residual Networks for Single Image Super-Resolution," Proceedings of the IEEE Conference on Computer Vision and Pattern Recognition Workshops, Jul. 2017, pp. 136-144.

(Continued)

*Primary Examiner* — Ping Y Hsieh
(74) *Attorney, Agent, or Firm* — Nicholson De Vos Webster & Elliott, LLP

(57) ABSTRACT

Techniques for learned lossy image compression are described. A system may perform image compression using an image compression model that includes an encoder to compress an image and a decoder to reconstruct the image. The encoder and the decoder are trained using machine learning techniques. After training, the encoder can encode image data to generate compressed image data and the decoder can decode compressed image data to generate reconstructed image data.

20 Claims, 12 Drawing Sheets

(56) References Cited

OTHER PUBLICATIONS

Mathieu M., et al., "Deep Multi-Scale Video Prediction Beyond Mean Square Error," Published as a conference paper at ICLR 2016, Nov. 2015, 14 pages.

Sajjadi M S.M., et al., "EnhanceNet: Single Image Super-Resolution Through Automated Texture Synthesis," IEEE International Conference on Computer Vision (ICCV), Jul. 2017, pp. 4501-4510.

Skodras A., et al., "The JPEG 2000 Still Image Compression Standard," IEEE Signal processing magazine, Sep. 2001, vol. 18 (5), pp. 36-58.

Toderici G., et al., "Variable Rate Image Compression with Recurrent Neural Networks," Published as a conference paper at ICLR 2016, Nov. 2015, 12 pages.

Wallace G K., "The JPEG Still Picture Compression Standard," IEEE Transactions on Consumer Electronics, vol. 38 (1), Feb. 1992, 17 pages.

Wang Z., et al., "Multiscale Structural Similarity for Image Quality Assessment," IEEE the Thrity-Seventh Asilomar Conference on Signals, Systems & Computers, Nov. 9-12, 2003, vol. 2, pp. 1398-1402.

Yu J., et al., "Wide Activation for Efficient and Accurate Image Super-Resolution," Computer Vision and Pattern Recognition, Aug. 2018, 10 pages.

Zhang R., et al., "The Unreasonable Effectiveness of Deep Features as a Perceptual Metric," IEEE/CVF Conference on Computer Vision and Pattern Recognition (CVPR), Apr. 2018, 14 pages.

\* cited by examiner

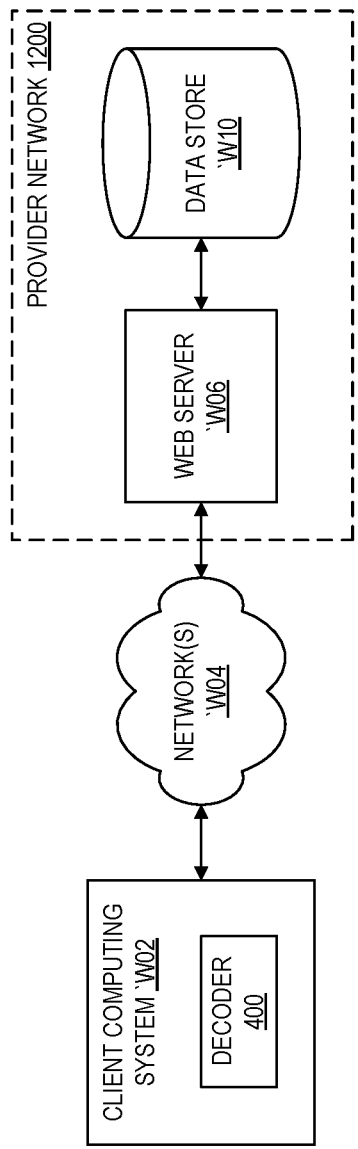
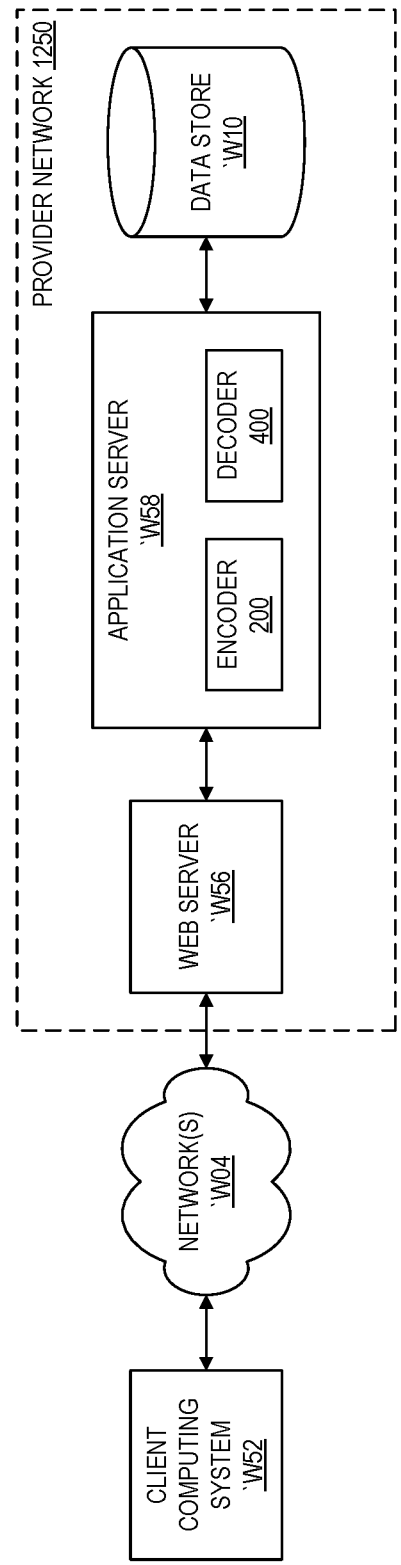

LEARNED LOSSY IMAGE COMPRESSION CODEC

BACKGROUND

Electronic devices are increasingly used to display and process content, such as images. As a quality of the content increases, a corresponding size of the content or bandwidth required to send and receive the content increases accordingly. Due to data storage and transmission limitations, it is beneficial to reduce the size of the content or the bandwidth required to send/receive the content, which may be done by performing image compression.

BRIEF DESCRIPTION OF DRAWINGS

Various embodiments in accordance with the present disclosure will be described with reference to the following drawings.

FIGS. 12A-12B illustrate examples of environments for implementing some embodiments of the present disclosure.

DETAILED DESCRIPTION

Figure 1:
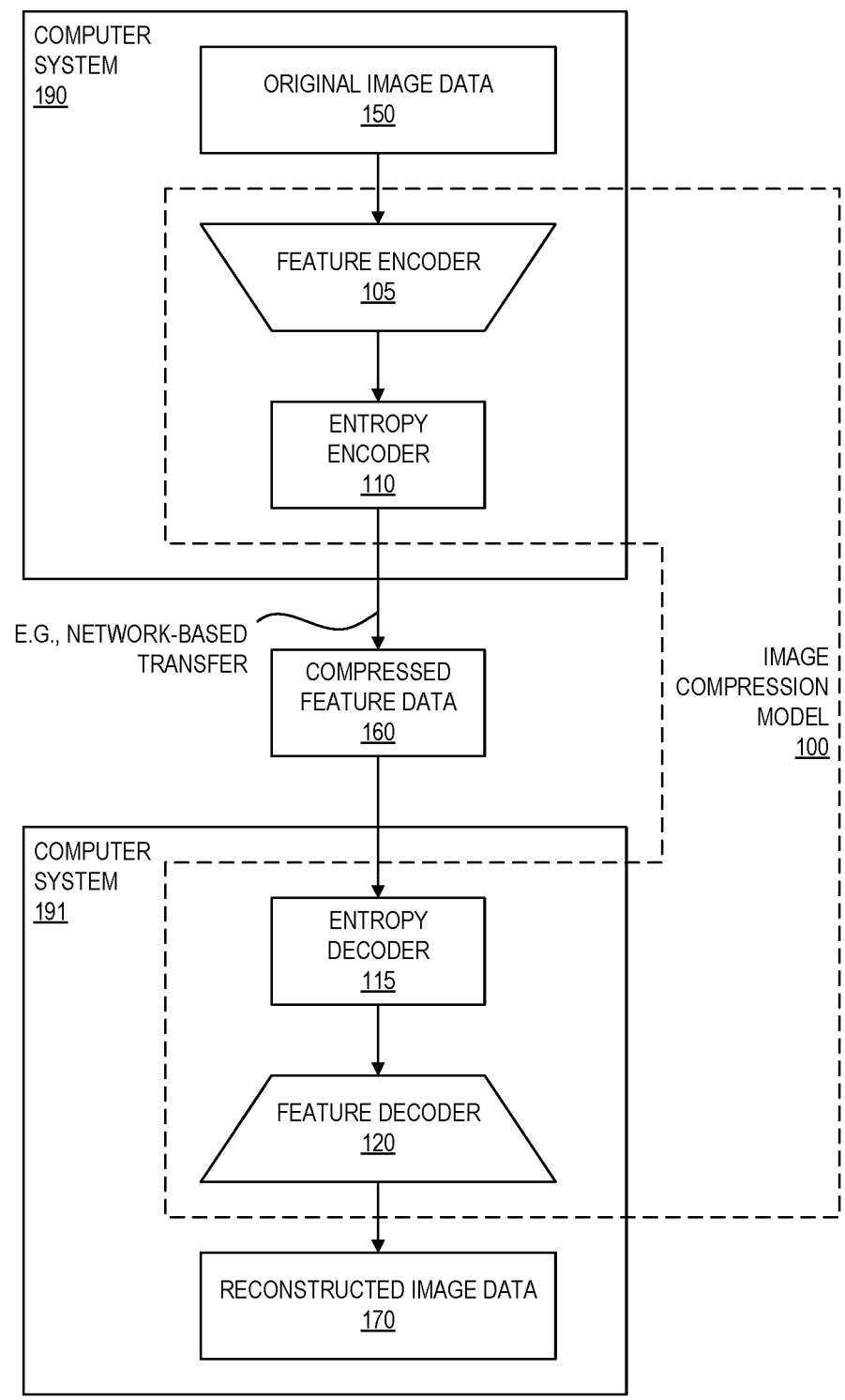
FIG. 1 is a conceptual diagram of an image compression model according to some embodiments of the present disclosure.

Electronic devices are increasingly used to display and process content, such as images. As a quality of the content increases, a corresponding size of the content or bandwidth required to send and receive the content increases accordingly. Due to storage and transmission limitations, it is beneficial to reduce the size of the content or the bandwidth required to send/receive the content, which may be done by performing image compression.

One area of image compression research is lossy image compression. In contrast to lossless compression that can perfectly reconstruct a source image, lossy compression discards some portion of the information content of a source image. A major challenge in lossy compression research is identifying what can be discarded while still achieving acceptable reproduction of the source image. Traditional lossy image compression techniques are hand-engineered rather than trained and, as a result, have a fixed set of ways in which the compression can be modified. For example, the Joint Photographic Experts Group ("JPEG") standardized one form of lossy image compression—commonly referred to as JPEG—that uses the Discrete Cosine Transform ("DCT") to identify and discard high-frequency information that is less perceptible to the human visual system. Other vector- or raster-based compressed image file formats are commonly used to store and distribute image (e.g., across the internet). Exemplary formats include Portable Network Graphics (PNG), Scalable Vector Graphics (SVG), Graphics Interchange Format (GIF).

A separate field of research from image compression is image super-resolution. Image super-resolution is concerned with generating a high-resolution image from one or more low-resolution images. In multi-image super-resolution, sources of noise in the low-resolution images—e.g., atmospheric noise, sensor motion, optics anomalies—are isolated to generate a higher resolution image. In single-image super-resolution, interpolative techniques are used to essentially create pixels from other pixels.

Various embodiments of methods, apparatus, systems, and non-transitory computer-readable storage media for implementing learned lossy image compression using super-resolution techniques are described. As a relatively nascent field of research, learned image compression diverges from traditional image compression approaches in that the compression algorithm is not hand-engineered such as where JPEG elected to use DCT to identify image content to be discarded. Instead, learned image compression models train in an iterative process in which the model is repeatedly tuned to ultimately "intuit" which information can be discarded. The remaining data, often referred to as features and represented as a vector, can be used for subsequent storage and transmission (and further compressed based on an entropy model). Subsequently, super-resolution-based techniques can be used to reconstruct the original image by creating pixels from features.

Additionally or alternatively, various embodiments of methods, apparatus, systems, and non-transitory computer-readable storage media for implementing a technique to evaluate how closely a reconstructed image matches the original image (whether in the field of image compression, super-resolution, or other image areas of study). It has been discovered that viewers of images compressed using learned lossy image compression techniques and traditional lossy compression techniques prefer the reconstructed images from traditional techniques even though existing quantitative metrics indicate that the learned lossy image compression techniques outperform the traditional lossy compression techniques. For example, a source image was compressed and reconstructed using a learned lossy compression model and using traditional lossy compression techniques (e.g., JPEG). When viewers were presented with the two reconstructed images, viewers would often prefer the reconstructed image from the traditional lossy compression technique. At the same time, a metric, such as the structural similarity metric ("SSIM"), comparing the reconstructed image of the learned lossy compression model to the source image would indicate a higher degree of similarity between the two images than the same metric comparing the reconstructed image of the traditionally lossy compression technique to the source image. Techniques disclosed herein introduce a new metric to evaluate how closely a reconstructed image matches the source image. In particular, the new metric (sometimes referred to as a "deep perceptual loss" metric) is generated by performing a feature-based comparison of representations of the image obtained from a pre-trained neural network. This new metric may be blended together with one or more existing metrics and used, for example, as a loss function for use when training learned lossy image compression models to improve the perceived quality of the reconstructed images.

FIG. 1 is a conceptual diagram of a system configured implementing an image compression model according to some embodiments of the present disclosure. As illustrated, a learned image compression model ("the model") 100 includes a super-resolution-based feature encoder 105, an entropy encoder 110, an entropy decoder 115, and feature decoder 120. As described above, super-resolution is a field of research concerned with generating high resolution imagery from lower resolution imagery—essentially using pixel data to create new pixels. Unlike traditional super-resolution approaches, the model 100 uses SR-based techniques to create pixels of a reconstructed image from a feature vector rather than from pixel-based data. Such feature vectors may serve as the input to or output from various processing layers or stages of the learned image compression model. Note that the term feature vector may be also referred to as an embedding or representation. Furthermore, if dimensionality is specified, a feature vector may be referred to as a feature map (e.g., in two-dimensions) or feature volume (e.g., in three-dimensions), where the corresponding feature vector is algorithmically derived from the feature map or feature volume. As used herein, the notation H×W refers to the height and width of an input or output tensor, and the notation H×W×C refers to the height, width, and number of channels or depth of an input or output tensor.

As a learned image compression model, the model 100 is trained using machine learning techniques as described below with reference to FIG. 7. At its core, training the model 100 involves subjecting the model 100 to many training images and tuning the model 100 based on how closely the reconstructed image data 170 for a given image matches the original image data 150 for the image. Through the training process, the model 100 learns which portions of an image data can be discarded (to achieve compression) without causing a significant impact on the quality of a reconstructed image. Unlike traditional hand-engineered codecs that rely on a defined set of operations that largely ignore the content or visual semantics of an image, a trained model can process an image to mathematically represent the "features" of the image that may not be readily identifiable and/or describable in operational terms to a human.

Introducing super-resolution techniques within a learned image compression model has achieved results significantly better than the de facto standard for image compression— JPEG. Where JPEG might achieve a compression ratio of about 10:1, an image compression model based on the disclosure and teachings provided herein has achieved compression ratios of about 20:1 while maintaining similar quality. For example, using JPEG-based compression, an uncompressed 128×128×3 image (i.e., a height of 128 pixels, a width of 128 pixels, and three 8-bit channels for red, green, and blue) might have a compressed file size of 4.8 kilobytes (kB) for about 0.3 bits per pixel ("bpp"). Using the techniques disclosed herein, the same uncompressed image might have a compressed file size of 2.4 KB for about 0.15 bpp. As a result, the techniques disclosed herein can dramatically reduce storage and transmission costs associated with image data.

After training, portions of the model 100 may be used independent from each other. In the illustrated embodiment, an encode-portion of the model 100, including the feature encoder 105 and the entropy encoder 110, is implemented by a computer system 190. An exemplary computer system is described below with reference to FIG. 11. Similarly, a decode-portion of the model 100, including the entropy decoder 115 and the feature decoder 120, is implemented by a computer system 191. The computer systems 190, 191 may be in communication via one or more networks. For example, the computer system 190 may be a server of a cloud-based web services provider that hosts images. The computer system 191 may be a personal computing device such as a smartphone or laptop that requests a hosted image. In this manner, the transmission and storage costs associated with transmitting the compressed feature data 160 relative to a traditional image compression format (e.g., JPEG) are reduced. As another example, the encode- and decode-portions of the model 100 can be part of transcoders implemented by one or more computers of a cloud-based web services provider. A transcoder that converts from a traditional image compression format (e.g., JPEG) to the compressed feature data 160 format can serve as an ingestion frontend to an image storage repository of the cloud-based web services provider to reduce storage costs. Likewise, a transcoder that converts from the compressed feature data 160 format to a traditional image compression format can serve as a consumption frontend to the image storage repository to serve images in the traditional image compression format in response to requests from clients (e.g., HyperText Transfer Protocol ("HTTP") GET requests).

The encode-portion of the model 100 receives original image data 150 and generates compressed feature data 160. The decode-portion of the model 100 receives the compressed feature data 160 and generates reconstructed image data 170. By storing and transmitting images as compressed feature data 160, the storage and transmission costs attributed to computer systems 190, 191 can be reduced.

Other implementations of the trained model 100 are possible. For example, the encode- and decode-portions of the model may be implemented on the same computer system to reduce the storage footprint associated with the image data. As another example, the encode- and decode-portions may be implemented as a frontend transcoding service to a data storage system that sends and receives images in existing formats while storing compressed feature data 160 on media (e.g., a solid-state drive).

Figure 2:
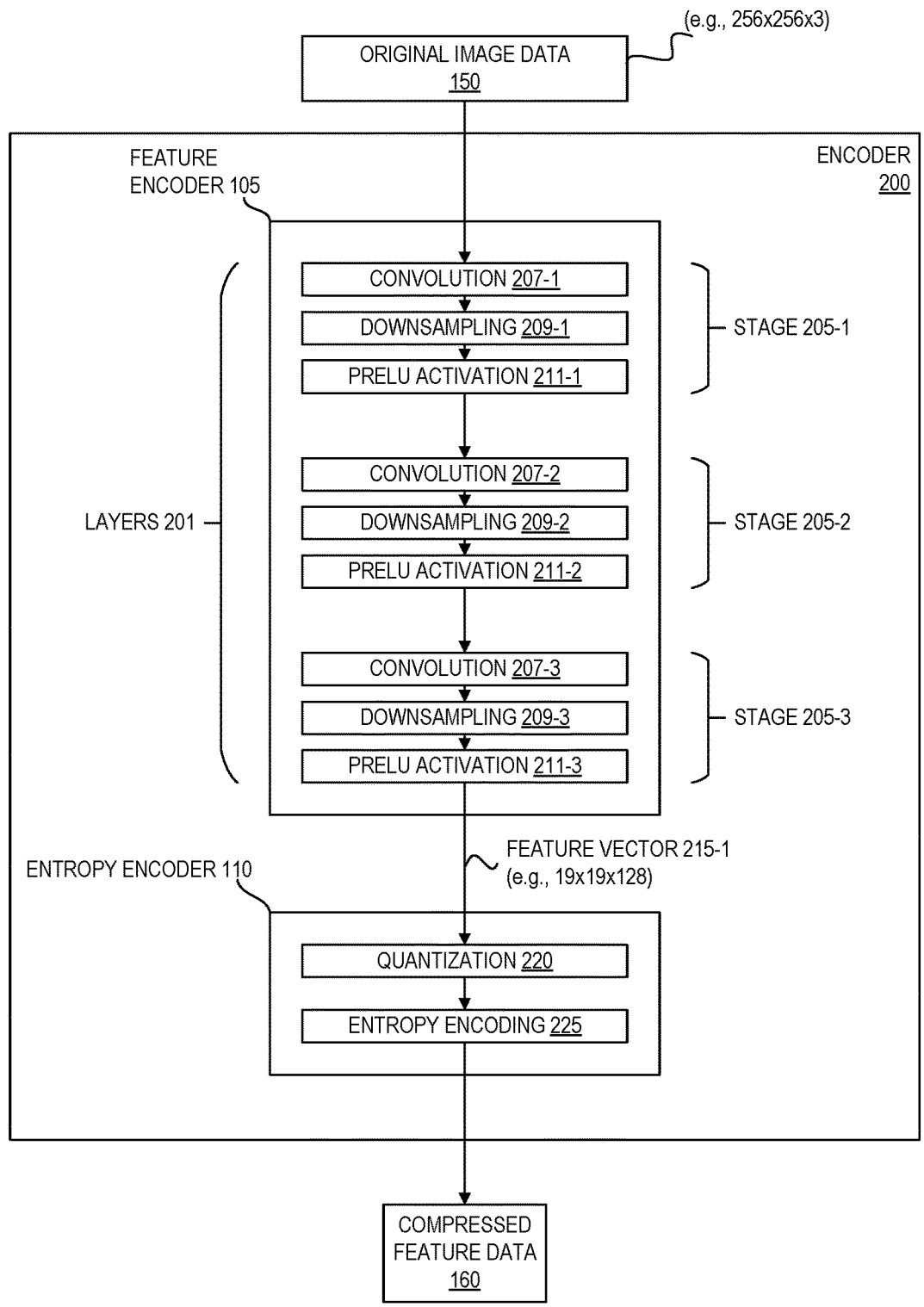
FIG. 2 is a conceptual diagram illustrating an example encoder of the image compression model according to some embodiments of the present disclosure.

FIG. 2 is a conceptual diagram illustrating an example encoder of the image compression model according to some embodiments of the present disclosure. As illustrated in FIG. 2, an encoder 200 includes the feature encoder 105 and the entropy encoder 110. The feature encoder 105 includes layers 201, which are layers of a neural network and at least some of which have parameters that are learned during training. The feature encoder 105 receives original image data 150 and generates a feature vector 215-1 that represents the original image data 150. For example, the feature encoder 105 may process original image data 150 having 196,608 values (e.g., a 256×256 pixel image having 3 color channels) to generate a feature vector 215-1 having 46,208 values (e.g., a 19×19×128 feature volume). In the illustrated embodiment, the layers 201 comprise multiple encoding stages 205 that process the original image data 150 to generate the feature vector 215-1. In particular, the layers 201 include three encoding stages 205, each encoding stage 205 performing convolution 207, downsampling 209, and parameterized rectified linear unit (PReLU) activation 211. Additional details on the convolution 207, downsampling 209, and PReLU activation 211 processes are described with reference to FIG. 3.

The convolution 207 process applies one or more kernels (sometimes referred to as filters) to input data to generate output data. For example, a 3×3 kernel applied to a 3×3 input can generate a 1×1 output by multiplying each value in an input by the corresponding value (or weight) in the kernel and summing the results (e.g., input (1,1)×kernel (1,1)+input (1,2)×kernel (1,2)+ . . . where (i, j) correspond to row and column of the input and kernel matrices). The kernel size can be expanded in multiple dimensions or applied to multiple distinct regions of the input to handle larger sizes of input data. For example, a 3×3 kernel can be applied to each of the forty-nine 3×3 sub-matrices of a 9×9 input to generate a 7×7 output. As another example, a 3×3×3 kernel can be applied to each of the 343 3×3×3 volumes of a 9×9×9 input to generate a 7×7×7 output.

The downsampling 209 process downsamples input data to generate output data having a lower dimensionality than the input data. For example, downsampling by two (e.g., 2× downsampling) cuts the height and width in half, such that input data having a first resolution (w×h) is processed to generate output data having a second resolution (w/2×h/2). Similarly, downsampling by four (e.g., 4×downsampling) cuts the height and width in quarter, such that input data having the first resolution (w×h) is processed to generate output data having a third resolution (w/4×h/4). The encoder 200 may perform downsampling using any technique known to one of skill in the art without departing from the disclosure, including averaging or maxpooling. For example, 2× downsampling may be performed by replacing a 2×2 grid of input values with a single output value generated by averaging the four input values (e.g., averaging), by selecting a highest value of the four input values (e.g., maxpooling), etc.

The PReLU activation 211 process applies normalization to (e.g., normalizes) input data to generate output data having normalized values. An exemplary PReLU function follows.

$$F(x) = \begin{cases} \alpha x, & x < 0; \alpha > 0 \\ x, & x \geq 0 \end{cases} \quad [1]$$

where F(x) represents the output, x represents the input, α represents a trainable scaling factor negative values of x. Each of the input values has an associated activation function. The output of the activations matches the size of the input. The encoder 200 may perform activation using other techniques known to one of skill in the art without departing from the disclosure, including sigmoid-based activation and Rectified Linear Unit (ReLU) activation.

FIG. 2 illustrates an example with three encoding stages 205, which may be referred to as first encoding stage 205-1, second encoding stage 205-2, and third encoding stage 205-3. Note that additional (or fewer) encoding stages 205 and/or encoding stages 205 with a different set and/or sequence of layers relative to other encoding stages may be implemented without departing from the disclosure. For example, an encoder 200 with four encoding stages 205 might generate a feature vector that is half of the size of an encoder with three encoding stages 205 if the final layer of the four-layer encoder includes a 2× downsampling process (assuming the convolution process of the fourth layer did not change the size).

As illustrated, each encoding stage 205 performs convolution 207, downsampling 209, and PReLU activation 211 processes, one or more of which may be parameterized. However, each of the encoding stages 205 can perform these processes using different parameters without departing from the disclosure. For example, the first encoding stage 205-1 performs first downsampling 209-1, which can downsample by four (e.g., 4× downsampling), the second encoding stage 205-2 can perform second downsampling 209-2, which can downsample by two (e.g., 2× downsampling), and the third encoding stage 205-2 can perform third downsampling 209-3, which can downsample by two (e.g., 2× downsampling), thereby producing a cumulative 16× downsampling by the three encoding stages 205. Similarly, the first convolution 207-1 can apply 128 9×9×3 filters (e.g., filters with a 9×9 receptive field that look at all three channels of the input), the second convolution 207-2 can apply 128 5×5×128 filters, and the third convolution 207-3 can apply 128 5×5×128 filters, where the filter weights for each filter used in the convolutions 207 are learned during training.

The entropy encoder 110 receives and compresses the feature vector 215-1 from the feature encoder 105 to generate the compressed feature data 160. As illustrated, the entropy encoder 110 includes a quantization 220 process and an entropy encoding 225 process. An exemplary quantization 220 process reduces a range of values to a fixed number of uniform bins. For example, performing quantization 220 may reduce a range of values from 256+ values to only 16 values. The fixed number of uniform bins (e.g., 16 values) correspond to symbols (e.g., characters) that are represented using a fixed number of bits per symbol (e.g., 4 bits per symbol). The entropy encoding 225 process can compress the quantized data further by encoding the symbols using a variable number of bits per symbol, such that frequently used symbols are stored with fewer bits and less frequently used symbols are stored with more bits, resulting in fewer bits used overall. In one embodiment, the entropy encoding 225 process implements an arithmetic coding, although other entropy coding techniques may be used. In some embodiments, one or more parameters of the quantization 220 process and the entropy encoding 225 process are trained. For example, if the quantization 220 process applies quantization weights to the feature vector 215-1 (e.g., by performing an element-wise division of the values of the feature vector 215 of size 19×19×128 by a quantization array of size 19×19×128), the image compression model can learn the quantization weights during training. Similarly, the entropy encoding 225 process can learn which symbols of the symbols in the quantized output occur with higher probability than other symbols (e.g., a probability distribution over the range of symbols) and generate a symbol table that assigns fewer bits to those symbols with higher occurrence probabilities. Other entropy encoding techniques known to one of skill in the art may be implemented without departing from the disclosure.

While FIG. 2 illustrates the feature encoder 105 with layers 201, including convolution 207, downsampling 209, and PReLU activation 211, this is intended for illustrative purposes only and the disclosure is not limited thereto. Other embodiments may introduce more or fewer layers or operations, different layers or operations, and/or different orders of layers or operations without departing from the disclosure. Furthermore, while FIG. 2 illustrates an encoder 200 with an entropy encoder 110, this is intended for illustrative purposes only and the disclosure is not limited thereto. Other encoders (not shown) may output a feature vector representing a compressed image for storage, transmission, or later entropy coding without departing from the disclosure.

Figure 3:
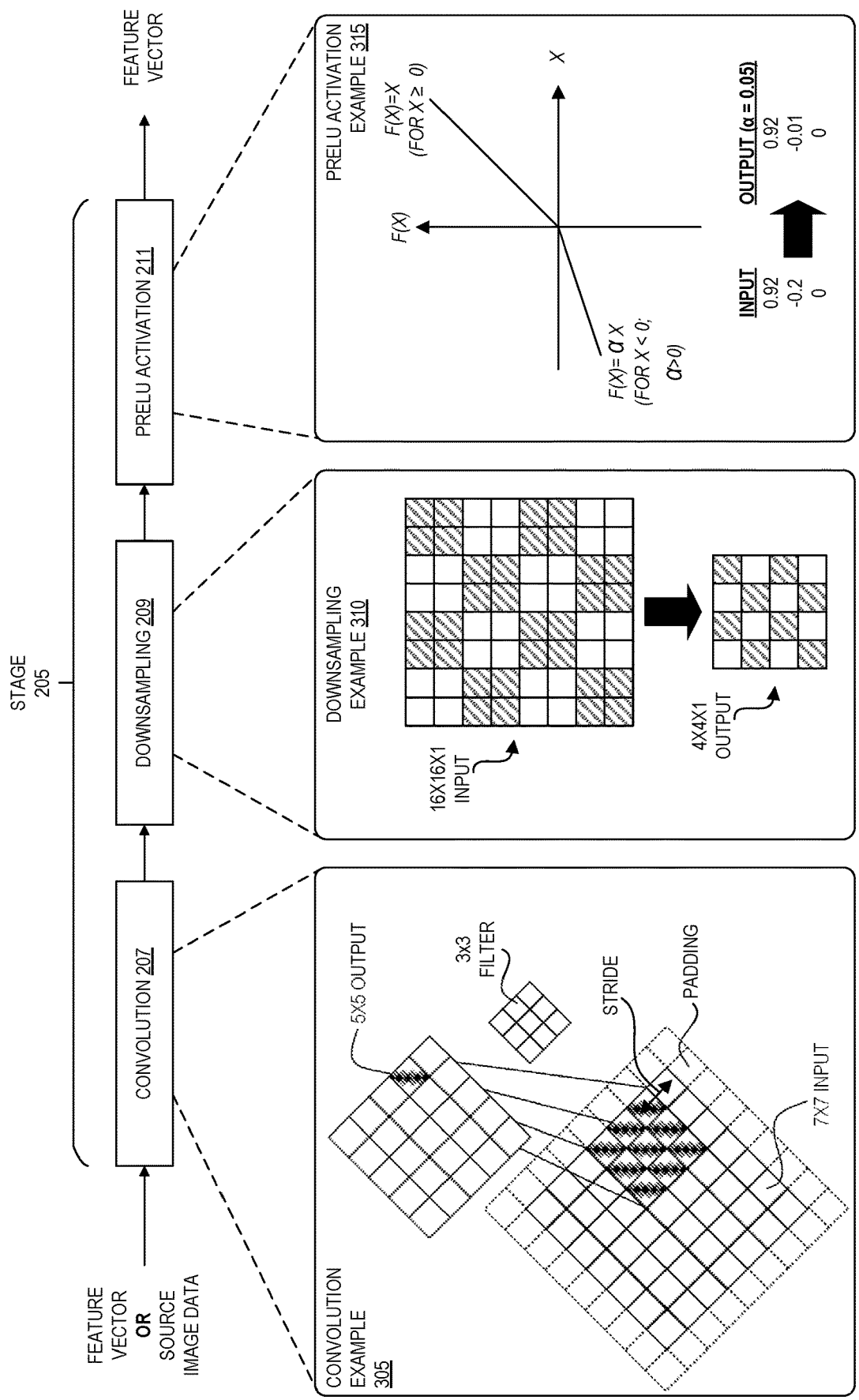
FIG. 3 illustrate examples of processing performed by the example encoder of the image compression model according to some embodiments of the present disclosure.

FIG. 3 illustrate examples of processing performed by the example encoder of the image compression model according to some embodiments of the present disclosure. As illustrated at the top of FIG. 3, the encoding stages 205 receive either a feature vector (e.g., encoding stages 205-2 or 205-3 from the previous stage) or the source image data (e.g., encoding stage 205-1) and output a feature vector. To demonstrate the processes of encoding stages 205, FIG. 3 illustrates a convolution example 305, an upsampling example 310, and a PReLU activation example 315.

As illustrated in the convolution example 305, convolution may be visualized through the repeated application of a two-dimensional kernel (or filter) matrix to a two-dimensional input matrix to generate a two-dimensional output matrix, for example. In particular, the convolution 207 process can be visualized as iteratively applying the kernel to subsets of the input data by sliding the kernel across and the input data (although in practice, the application of the filter to an input matrix can be accomplished with one or more matrix multiply operations). Each entry in the kernel is associated with a weight that may be learned during training. Application of the kernel to the input can be performed by calculating the sum of the individual products of the weights of the kernel multiplied by the values in the corresponding positions of the overlaid subset of the input. Parameters that affect the convolution process include the filter size (e.g., 3×3 vs 4×4), the input size (e.g., 9×9 vs 128×128), the stride (e.g., how far the kernel slides between applications to the input data), and whether padding is added to the input data (e.g., whether zeros or ones to increase the input size).

In the illustrated convolution example 305, a 3×3 filter is applied to a 7×7 input with a stride of 1 and no padding to generate a 5×5 output. As shown, the output value indexed by (1,4) where (e.g., 1st row from the top and $4^{th}$ column from the left) can be calculated as the sum of the individual products of the weights of the kernel multiplied by the values of the input when the top-left of the kernel is centered on the input at index (2,5). If padding of 1 was included, the padding effectively increases the size of the input to 9×9 and results in an output of 7×7 because the sliding of the kernel could start centered at input index (1,1) instead of (2,2). If the stride was increased from 1 to 2 with no padding, the resulting output would be 3×3 (e.g., the first row of the output based on the kernel centered at input indices (2,2), (2,4), and (2,6).

As noted above, the convolution 207 process may apply multiple kernels to an input. In doing so, the convolution 207 process increases the number of channels of the output. The resulting outputs matrices can be stacked end-to-end to form an output feature volume. For example, if three 3×3 filters were applied to the input of illustrated convolution example 305, the output feature volume would have dimensions 5×5×3 where the depth of the stack corresponds to the number of channels.

The input to the convolution 207 process often has multiple channels. For example, a source input image of resolution 256×256 could have three channels corresponding to the colors red, green, and blue. Likewise, an input from a prior convolution that applied multiple kernels could have a depth corresponding to the number of applied kernels. If the input has multiple channels, the convolution 207 process may apply different kernels to different channels (e.g., a kernel K1 is applied to a first channel of the input and a kernel K2 is applied to a second channel of the input), the same kernel across multiple channels (e.g., a 3×3×1 kernel with 9 different weights applied to three channels of the input), or expand the size of the kernel to cover multiple channels (e.g., a 3×3×3 kernel having 27 learned weights).

While the convolution example 305 illustrates one example of convolution, the disclosure is not limited thereto and the model 100 may perform convolution using any technique known to one of skill in the art.

As illustrated in the downsampling example 310, the downsampling 209 process may be visualized as input data having first dimensions (e.g., 8×8) is downsampled to generate output data having second dimensions (e.g., 4×4). For example, the input data is separated into 2×2 squares, such that a single value in the output data corresponds to a single square (e.g., 4 values) in the input data. Specifically, this can be represented as a first output value having coordinates (1, 1) in the output data being generated using first input values included in a first square (e.g., top-left square including entry coordinates (1, 1), (1, 2), (2, 1), and (2, 2)) in the input data. Similarly, a second output value having coordinates (1, 2) in the output data is generated using second input values included in a second square (e.g., including pixel coordinates (1, 3), (1, 4), (2, 3), and (2, 4)) in the input data, and so on.

Various techniques can be used to generate the downsampled output data from the input data. As described above, the output data may be generated using maxpooling (e.g., selecting a highest value from input values in the 2×2 square), a weighted average (e.g., a weighted sum of the input values included in the 2×2 square), etc. While the downsampling example 310 illustrates reducing the dimensions by two (e.g., 2× downsampling), the disclosure is not limited thereto and the downsampling 209 process may reduce the dimensions by four (e.g., 4× downsampling) and/or any other number without departing from the disclosure.

As illustrated in the PReLU activation example 315, output data is calculated from input data using equation [1]. In this example with an a value of 0.05, the input 0.92 generates an output 0.92, the input −0.2 generates an output −0.01, and the input 0 generates an output 0. Note that the PReLU activation 211 process typically does not change the dimensions of the output data relative to the input data (e.g., if the input is a feature volume of 19×19×128 the output is a feature volume of 19×19×128). Further note that an activation function for each value in the input (e.g., for a 19×19×128 input, there are 19×19×128 activation functions).

Figure 4:
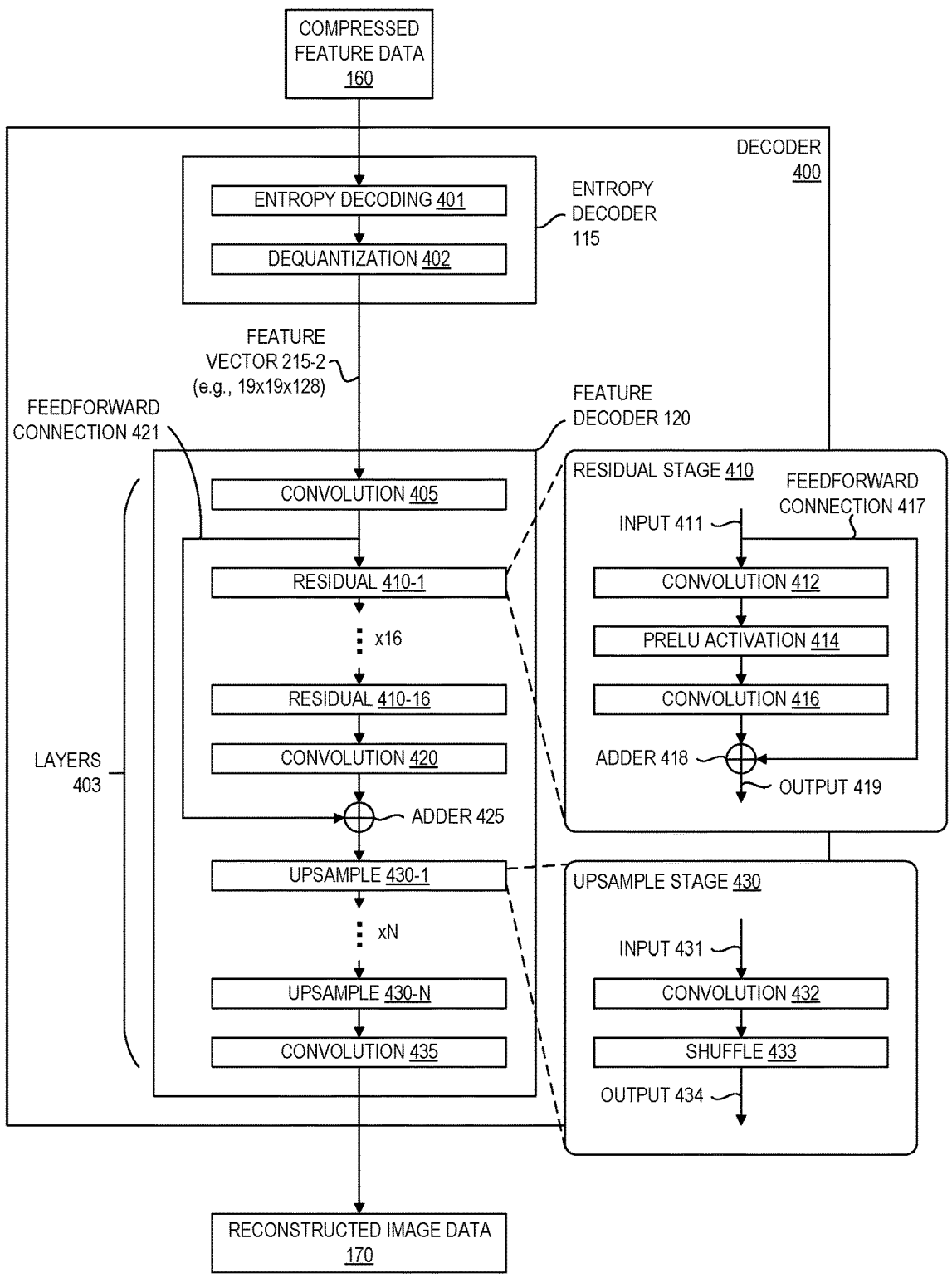
FIG. 4 is a conceptual diagram illustrating an example decoder of the image compression model according to some embodiments of the present disclosure.

FIG. 4 is a conceptual diagram illustrating an example decoder of the image compression model according to some embodiments of the present disclosure. As illustrated in FIG. 4, a decoder 400 includes the entropy decoder 115 and the feature decoder 120. The entropy decoder 115 receives and decompresses the compressed feature data 160 to generate a feature vector 215-2. As illustrated, the entropy decoder 115 includes an entropy decoding 401 process and a dequantization 402 process (sometimes referred to as inverse quantization). The entropy decoding 401 process can decompress the feature vector 215-2 into quantized data by reversing the entropy encoding 225 process. In particular, the entropy decoding 401 process replaces the variable number of bits per symbol used to represent symbols by the entropy encoding 225 process with their corresponding symbol, again based on the frequency of symbols that can appear in the quantized data. The dequantization 402 process reverses the quantization 220 process to generate the feature vector 215-2 from the quantized data. Note that the feature vector 215 output from the dequantization 402 process is referenced as −2 instead of −1 due to losses attributed to the quantization. In some embodiments, one or more parameters of the entropy decoding 401 process and the dequantization 402 process are trained (e.g., the inverses of the quantization weights and symbol frequencies learned for the quantization 220 process and the entropy encoding 225 process described above). Other entropy decoding techniques known to one of skill in the art may be implemented without departing from the disclosure.

The feature decoder 120 includes layers 403, which are layers of a neural network and at least some of which have parameters that are learned during training. The feature decoder 120 receives the feature vector 215-2 and generates the reconstructed image data 170. For example, the feature decoder 120 may process a feature vector 215-2 having 46,208 values (e.g., a 19×19×128 feature volume) to generate reconstructed image data 170 having 196,608 values (e.g., a 256×256 pixel image having 3 color channels).

In the illustrated embodiment, the layers 403 include a convolution 405 layer that receives the feature vector 215-2 and generates an output which is then processed by one or more residual stages 410. As illustrated, the residual stage 410-1 is the first of sixteen residual stages where the output of each residual stage serves as the input to the next residual stage (e.g., the output from residual stage 410-1 is the input to residual stage 410-2, the output from residual stage 410-2 is the input to residual stage 410-3, and so on).

As shown in the detailed view of a residual stage 410, the residual stage 410 has an input 411 and an output 419. For the first residual stage 410-1, the input 411 corresponds to the output of the convolution 405 layer, and for the remaining residual stages 410, the input 411 corresponds to the output 419 of the previous residual stage. For the last residual stage 410-16, the output 419 corresponds to the input to a convolution 420 layer. In a residual stage 410, the input 411 is processed by a convolution 412 layer, a PReLU activation 414, and a convolution 416 layer. The convolution 412, 416 layers perform convolutions using one or more kernels as described herein, and the PReLU activation 414 normalizes its input to generate an output as described herein. The input 411 of the residual stage 410 is fed forward via a feedforward connection 417 for an element-wise addition to the output of the convolution 416 layer by an adder 418 to generate the output 419. To facilitate element-wise addition by the adder 418, the dimensionality of the input 411 should match the dimensionality of the output of the convolution 416 layer. For example, for a 19×19×128 input 411, the convolution 416 layer should generate a 19×19×128 output. Furthermore, since the residual stages 410-1 through 410-16 are chained, the dimensionality of the input 411 to the first residual stage 410-1 should match the dimensionality of the output 419 of the last residual stage 410-16. Alternatively, for one or more of the residual stages 410, the dimensionality of the input 411 may be adjusted to match the dimensionality of the output of the convolution 416 layer (e.g., via upsampling or downsampling), which is sometimes referred to as residual dilation. Additional details on the residual stage 410 are described with reference to FIG. 5.

The convolution 405, 420 layers bookend the residual stages 410, and the output of the convolution 405 is fed forward via a feedforward connection 421 for an element-wise addition to the output of the convolution 420 by an adder 425. The convolution 405, 420 layers perform convolutions using one or more kernels as described herein. To facilitate element-wise addition by the adder 425, the dimensionality of the output of the convolution 405 layer should match the dimensionality of the output of the convolution 420 layer. Alternatively, the output of the convolution 405 layer may be adjusted to match the output of the convolution 420 layer by, for example, upsampling or downsampling. The output of the adder 425 is an input to one or more upsample stages 430.

As illustrated, the upsample stage 430-1 is the first of N upsample stages where N is some number of upsampling stages to match the resolution of the reconstructed image data 170 to the resolution of the original image data 150. The output of each upsample stage serves as the input to the next upsample stage (e.g., the output from upsample stage 430-1 is the input to upsample stage 430-2, the output from upsample stage 430-2 is the input to upsample stage 430-3, and so on).

As shown in the detailed view of an upsample stage 430, the upsample stage 430 has an input 431 and an output 434. For the first upsample stage 430-1, the input 431 corresponds to the output of the adder 425, and for the remaining upsample stage 430, the input 431 corresponds to the output 434 of the previous upsample stage. For the last upsample stage 430-N, the output 434 corresponds to the input to a convolution 435 layer. In an upsample stage 430, the input 431 is processed by a convolution 432 layer and a shuffle 433 operation. The convolution 432 layer performs convolutions using one or more kernels as described herein. The shuffle 433 operation modifies the dimensionality of its output relative to its input. In particular, the shuffle 433 operation reduces the number of channels in the input to increase the height and width of the output. For example, the shuffle 433 operation can generate 38×38×32 output from a 19×19×128 input. Note that in some embodiments, a convolution 432 layer of an upsample stage 430 can increase the number of channel dimensions by applying multiple kernels to the input, and the associated shuffle 433 operation of the upsample stage 430 can increase the height and width dimensions of the output using the increased number of channels. Additional details on the upsample stage 430 are described with reference to FIG. 6.

The convolution 435 layer receives the output from the final upsample stage 430-N and performs convolutions using one or more kernels as described herein to generate the reconstructed image data 170 having a resolution that matches the original image data 150 (e.g., a H×W resolution and three channels for color). In one embodiment, the convolution 435 layer uses a single kernel to generate the reconstructed image data 170.

While FIG. 4 illustrates the feature decoder 120 with convolution 405, 420, 435 layers, residual stages 410, and upsample stages 430 and associated connectivity, this is intended for illustrative purposes only and the disclosure is not limited thereto. Other embodiments may introduce more or fewer layers or operations, different layers or operations, and/or different orders of layers or operations without departing from the disclosure. Furthermore, while FIG. 4 illustrates a decoder 400 with an entropy decoder 115, this is intended for illustrative purposes only and the disclosure is not limited thereto. Other decoders (not shown) may receive a feature vector representing a compressed image with entropy coding without departing from the disclosure.

Figure 5:
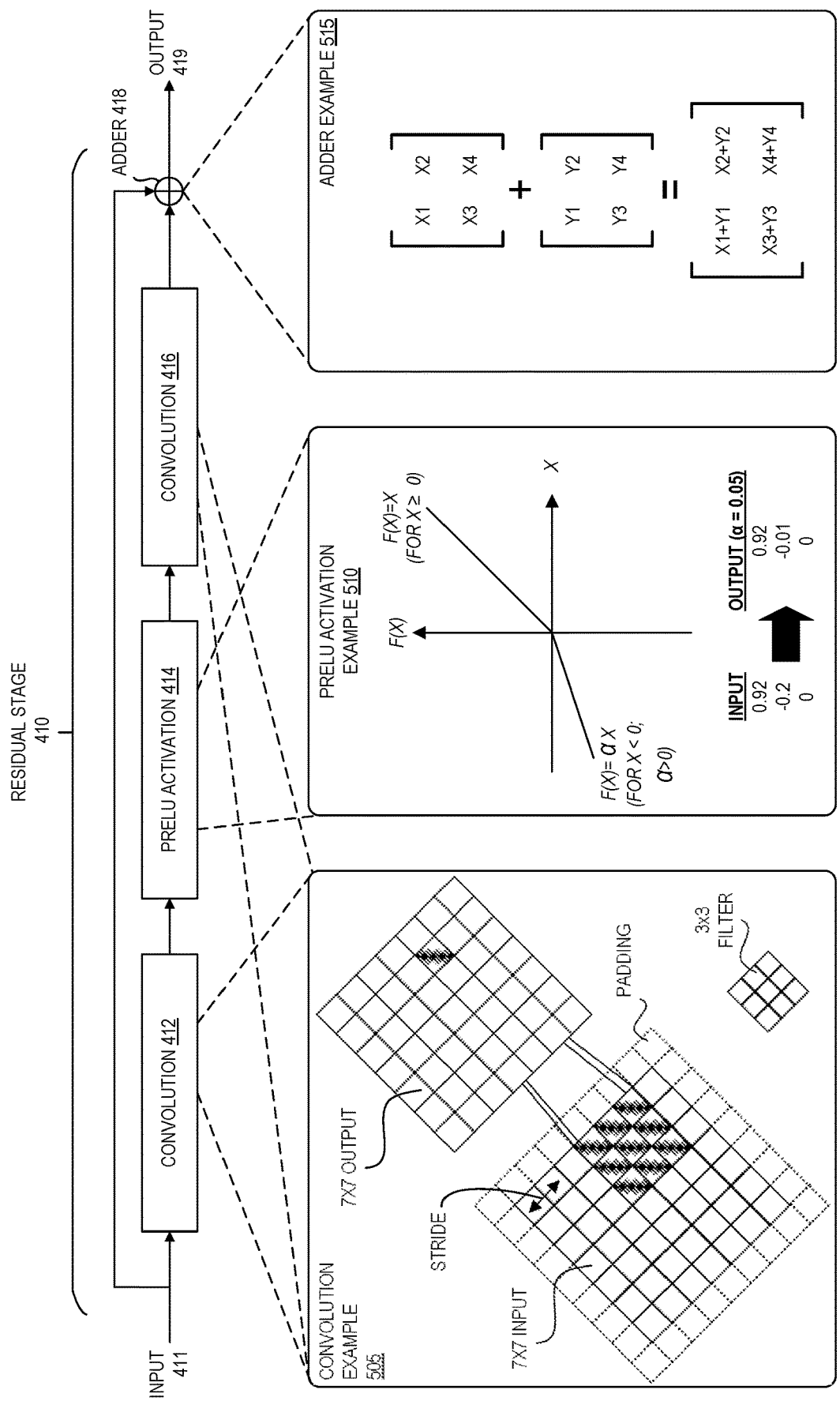
FIG. 5 illustrate examples of processing performed by the example decoder of the image compression model according to some embodiments of the present disclosure.

FIG. 5 illustrate examples of processing performed by the example decoder of the image compression model according to some embodiments of the present disclosure. As illustrated at the top of FIG. 5, a residual stage 410 includes a convolution 412 layer, a PReLU activation 414, and a convolution 416 layer. The residual stage 410 receives an H×W×C input and generates an output of the same size. To demonstrate the processes of the residual stage 410, FIG. 5 illustrates a convolution example 505, a PReLU activation example 510, and an adder example 515.

The description of convolution for the convolution example 305, above, including parameters such as kernels used, kernel sizes, stride, zero padding, and the like, is applicable to the convolution example 505. In the convolution example 505, a convolution 412, 416 layer receives as 7×7 input and, using a padding of 1 and a 3×3 kernel, generates a 7×7 output. In some embodiments, the convolution 412, 416 layers generate outputs having the same dimensions as their inputs to facilitate the element-wise addition by the adder 418. In other embodiments, the convolution 412 layer may reduce or increase the dimensionality of its output relative to its input, and the convolution 416 layer may reverse the reduction to or increase in the size of the output of the convolution 412 layer to preserve the dimensionality of the output of the residual stage 410 relative to its input.

The description of convolution for the PReLU activation example 315, above, is applicable to the PReLU activation example 510.

As illustrated in the adder example 515, the adder 418 performs element-wise addition of corresponding values in two input matrices. In particular, the adder 418 adds the values at index (1,1) (i.e., X1+Y1), the values at index (1,2) (i.e., X2+Y2), the values at index (2,1) (i.e., X3+Y3), and the values at index (2,2) (i.e., X4+Y4). Other sized inputs are possible (e.g., tensors of order 1, 2, 3, etc.). Note that the adder example 515 is also applicable to the adder 425 of FIG. 4.

Figure 6:
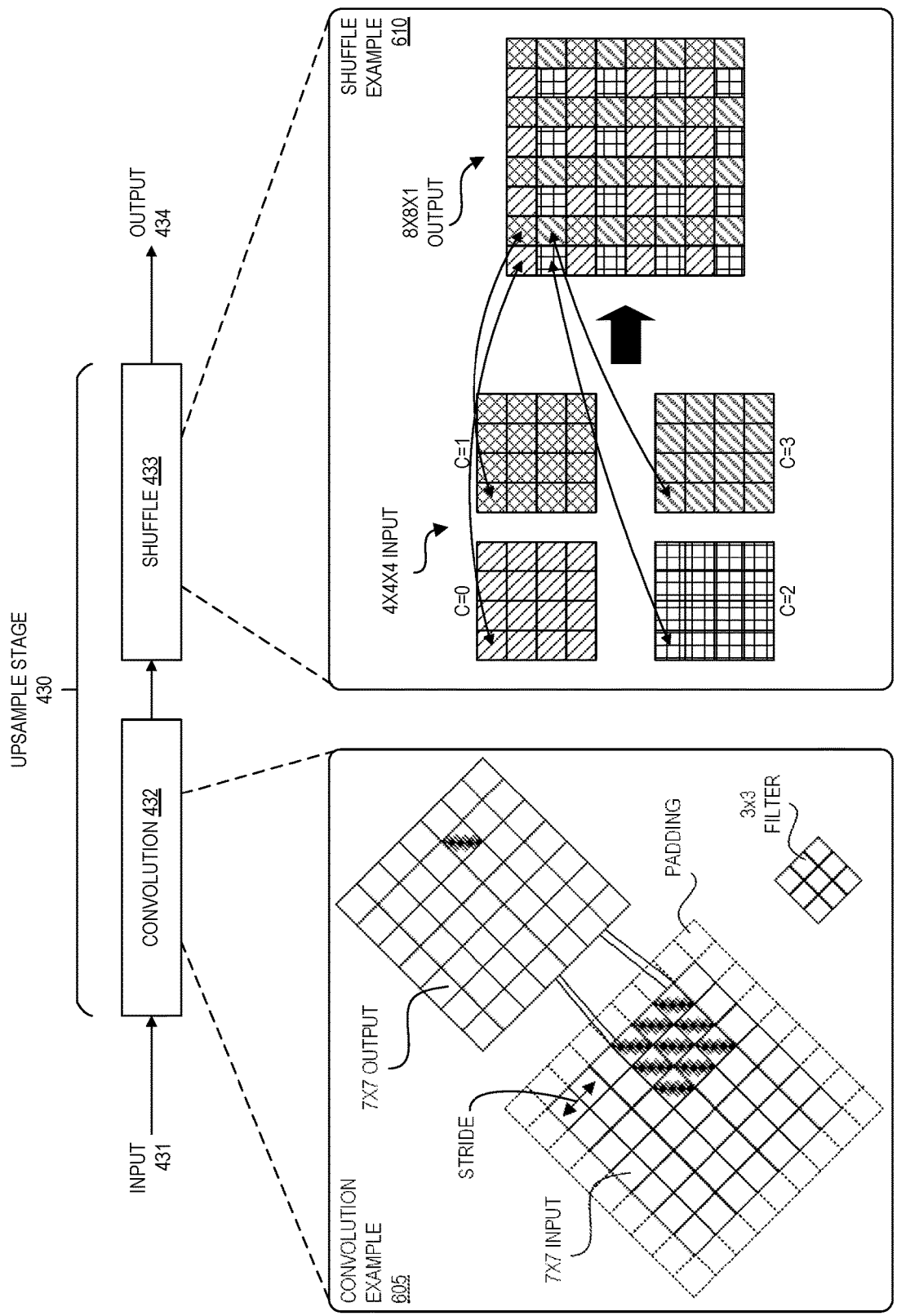
FIG. 6 illustrate additional examples of processing performed by the example decoder of the image compression model according to some embodiments of the present disclosure.

FIG. 6 illustrate additional examples of processing performed by the example decoder of the image compression model according to some embodiments of the present disclosure. As illustrated at the top of FIG. 6, an upsample stage 430 includes a convolution 432 layer and a shuffle 433 operation. The upsample stage 430 receives an H×W×C input 431 and generates an output 434 of a larger total number of elements than the input 431 (e.g., the product of the three dimensions of the output 434 is greater than the product of the three dimensions of the input 431). In some embodiments, the upsample stage 430 receives an H×W×C input and generates an output of larger total size having increased H×W dimensions and decreased C dimension relative to the input. To demonstrate the processes of the upsample stage 430, FIG. 6 illustrates a convolution example 605 and a shuffle example 610.

The description of convolution for the convolution examples 305 and 505, above, including parameters such as kernels used, kernel sizes, stride, zero padding, and the like, is applicable to the convolution example 605. As illustrated, a convolution 432 receives as 7×7 input and, using a padding of 1 and a 3×3 kernel, generates a 7×7 output. Note that in some embodiments, the convolution 412 layer may increase the dimensionality of its output relative to its input. For example, the convolution 412 layer may increase the number of channels in the output based on the number of kernels applied to the input, as described above. As another example, the convolution 412 layer may increase the height and/or width of the output relative to the input through upsampling (not shown), such as via interpolation, transposed convolution, etc. For example, the illustrated 7×7 input may be upsampled into a 13×13 input prior to convolution by one or more kernels.

As illustrated in the shuffle example 610, the shuffle 433 operation upsamples by modifying an input of dimensions H×W×C·$r^2$ to an output of dimensions r·H×r·W×C. For example, the shuffle 433 operation can generate 38×38×32 output from a 19×19×128 input (r=2). An exemplary shuffle 433 operation from an input IN to an output OUT follows.

$$OUT_{x,y,c} = IN_{\lfloor x/r \rfloor, \lfloor y/r \rfloor, (C \cdot r \cdot mod(x,r)) + (C \cdot mod(y,r)) + C)} \qquad [2]$$

In the illustrated example, the output value at (0,0,0) of the 8×8×1 output from the 4×4×4 input is the input value at (0,0,0), the output value at (1,0,0) of the 8×8×1 output from the 4×4×4 input is the input value at (0,0,1), the output value at (0,1,0) of the 8×8×1 output from the 4×4×4 input is the input value at (0,0,2), and the output value at (1,1,0) of the 8×8×1 output from the 4×4×4 input is the input value at (0,0,3). Although not illustrated, in some embodiments, an increase in the H×W dimensions of the output 434 relative to the input 431 of an upsample stage 430 can be achieved using other upsampling techniques besides or in addition to the shuffle operation. Other exemplary upsample techniques include interpolation, transposed convolution, etc.

Figure 7:
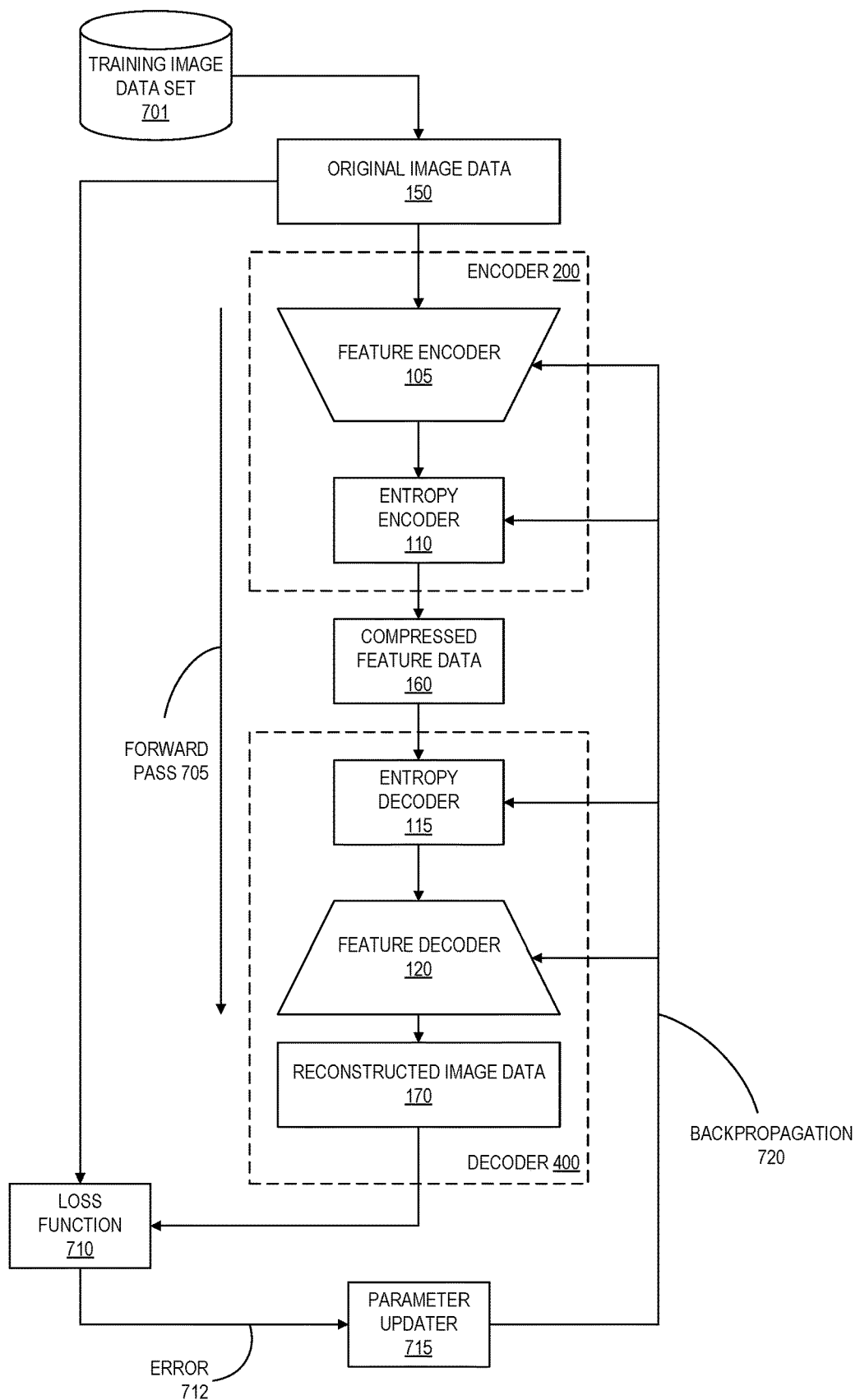
FIG. 7 is a conceptual diagram of training an image compression model according to some embodiments of the present disclosure.

FIG. 7 is a conceptual diagram of training an image compression model according to some embodiments of the present disclosure. As illustrated, training of the model 100 includes some of the same components described above with reference to FIG. 1. During training, the model 100 repeatedly compresses and reconstructs training images from a training image data set 701 as would be performed in deployed implementations an encoder 200 and decoder 400. However, in addition to generating reconstructed image data 170 via a forward pass 705 of original image data 150 the model 100, training also entails a backpropagation 720 of updates to the trainable parameters of the model 100. Exemplary trainable parameters include weights and biases used in the various convolutions (e.g., including kernel weights), parameters of the activation functions (e.g., a for PReLU activations), quantization factors for quantization and dequantization, symbol probabilities for entropy encoding and decoding, etc.

A loss function 710 measures an error 712 measurement or metric between the reconstructed image data 170 and the original image data 150. Exemplary loss functions include the SSIM and the multi-scale SSIM ("MS-SSIM") metrics that compare regions of pixels between the images and the mean-squared error ("MSE") metric that compares per-pixel differences between the images. Other loss functions may be employed to train the model 100 without departing from the disclosure.

A parameter updater 715 calculates the updates to the trainable parameters for backpropagation 720 through the model 100. The updates are based on the error 712 generated by the loss function 710. Through a process known as gradient descent, the parameter updater 715 can calculate updates for each of the trainable parameters based on their relative contribution to the error.

After training the model 100 using the training image data set 701, the model 100 can be deployed for inference applications. For example, the trained parameters can be used to respectively implement an encoder, such as the encoder 200, and a decoder, such as the decoder 400, on computer systems 190, 191 such as illustrated in FIG. 1.

Figure 8:
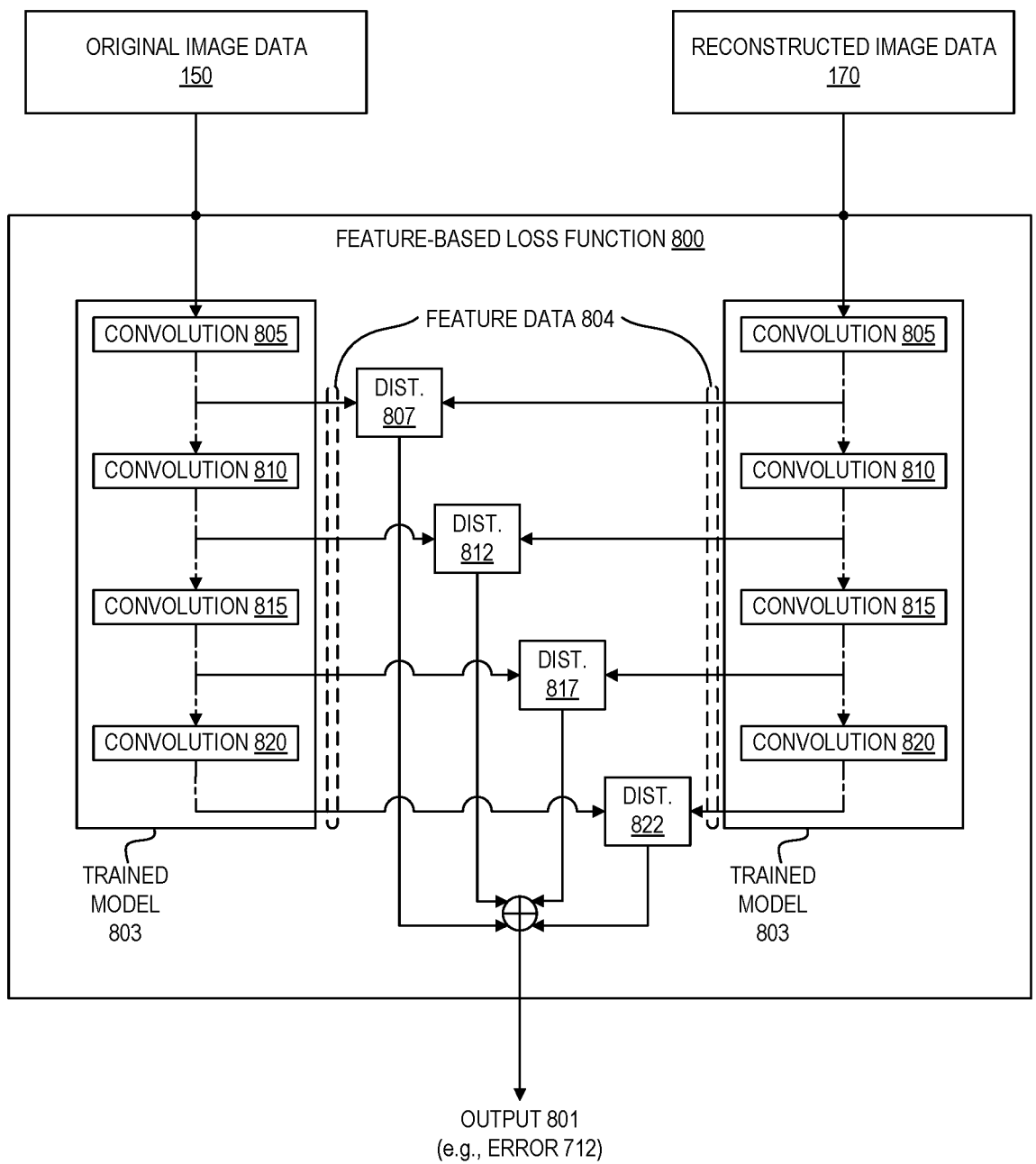
FIG. 8 is a conceptual diagram of a feature-based loss function for training a model according to some embodiments of the present disclosure.

FIG. 8 is a conceptual diagram of a feature-based loss function for training a model according to some embodiments of the present disclosure. Training a model that generates or reconstructs image data from image data, such as a learned image compression model or a super-resolution model, using a strictly quantitative metric can lead to a model that optimizes that metric. For example, training the model 100 using MS-SSIM leads to high MS-SSIM scores and higher scores than traditional image compression techniques like JPEG. However, when human users are presented with sets of images that were generated or reconstructed with different techniques from source images with comparable detail (e.g., a similar number of bits-per-pixel), the users subjective ranking of the images often differs from the ranking per the quantitative metrics. For example, a viewer may prefer a reconstruction of an image compressed with JPEG that has a lower MS-SSIM score than a reconstruction of an image compressed using learned image compression techniques.

To address these issues, a feature-based loss function 800 compares feature data of the images being compared that was extracted using another pre-trained model. As illustrated, the feature-based loss function 800 receives as inputs the original image data 150 and the reconstructed image data 170 and generates an output 801 (e.g., the error 712 of FIG. 7). A model 803 processes the input data 150, 170 to generate feature data 804. A norm or distance 807, 812, 817, 822 metric between the feature data 804 at the outputs of the respective layers is calculated, and the metrics from each layer are combined to generate the output 801.

In the illustrated example, the model 803 includes four convolution layers 805, 810, 815, and 820. Although not shown, the model 803 may include other layers, such as activation layers, downsampling layers, etc. In some embodiments, the feature data 804 is the output of each of the convolution layers 805, 810, 815, and 820 after activation. As described in the convolution examples above, convolution may apply one or more kernels to the input to generate a tensor with a corresponding number of channels in the output. For example, the feature data 804 compared at the outputs of layers 805 can be 55×55×48 tensors, the feature data 804 compared at the outputs of layers 810 can be 27×27×128 tensors, the feature data 804 compared at the outputs of layers 815 can be 13×13×192 tensors, and the feature data 804 compared at the outputs of layers 820 can be 13×13×192 tensors. In one embodiment, the output tensors are unit-normalized in the channel dimension and the output 801 is calculated as a p-norm as follows.

$$FBL(y, y') = \sum_l \frac{1}{H_l W_l} \sum_{h,w} \|w_l \odot (z^l_{h,w} - z'^l_{h,w})\|^2_2 \quad [3]$$

where FBL(y, y') is the feature-based loss metric between a source image y and a generated image y', $z^l$ and $z'^l$ are the unit-normalized tensors which are scaled channel-wise by a weight vector $w_l$, l is the layer, and h and w are the height and width of the respective layer.

While FIG. 8 illustrates the calculation of the output 801 from feature-based comparisons at the output of four convolution layers, this is intended for illustrative purposes only and the disclosure is not limited thereto. Other embodiments may introduce more or fewer layers and perform different norms on the feature data 804 without departing from the disclosure.

Figure 9:
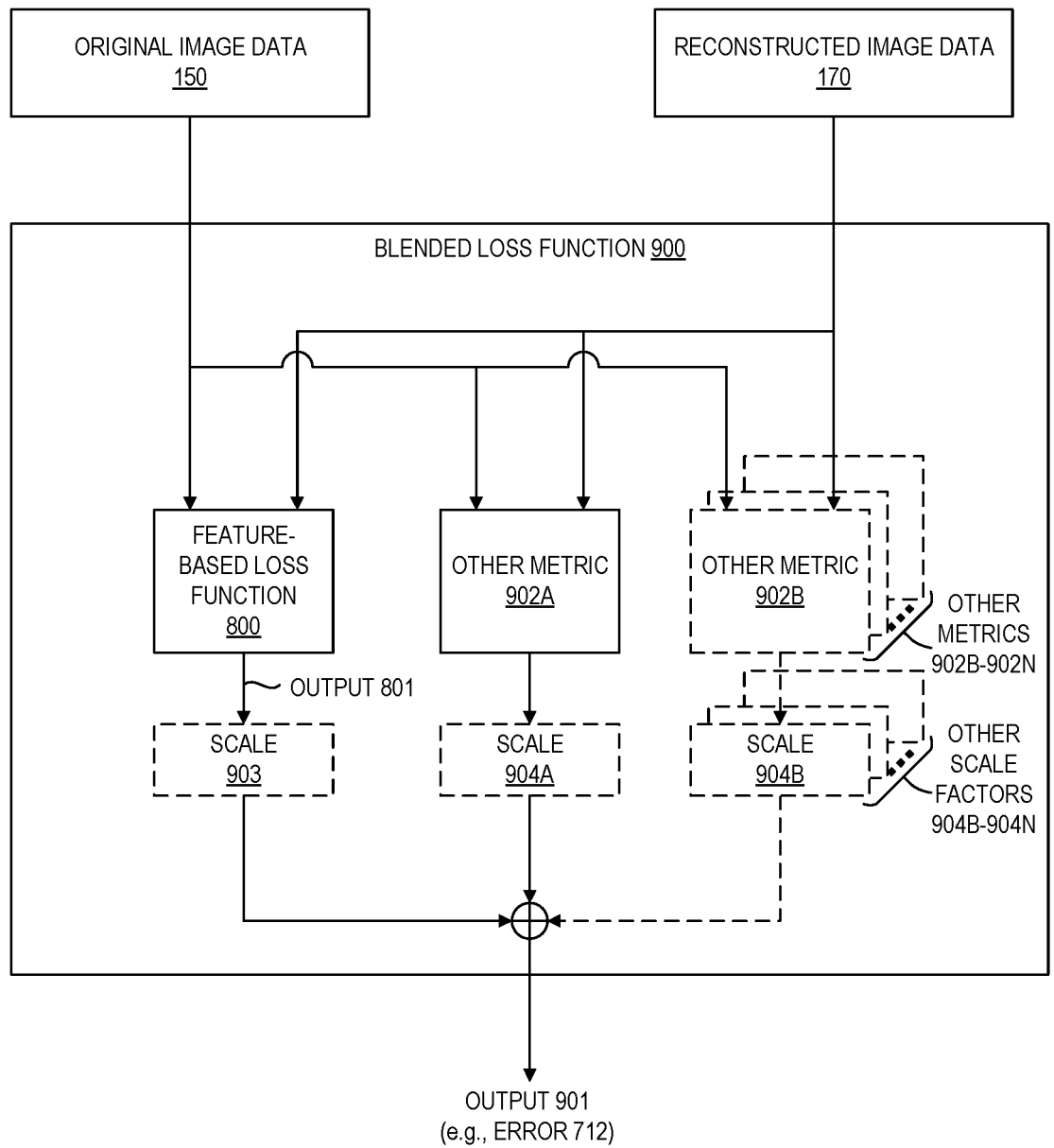
FIG. 9 is a conceptual diagram of a blended loss function for training a model according to some embodiments of the present disclosure.

FIG. 9 is a conceptual diagram of a blended loss function for training a model according to some embodiments of the present disclosure. As illustrated, the blended loss function 900 receives as inputs the original image data 150 and the reconstructed image data 170 and generates an output 901 (e.g., the error 712 of FIG. 7). The blended loss function 900 combines the feature-based loss function 800 with one or more other metrics 902, such as MS-SSIM. Depending on the natural output range of the loss functions 800, 902, one or more of the outputs may be scaled 903, 904, by a scale factor. For example, if the output 801 of the loss function 800 is [0,1] and the output of the other metric 902 is [0,2], the output 801 can be scaled 903 by 2 or the output of the other metric 902A can be scaled 904A by a factor of ½ to give the two outputs equal weighting in the overall output 901. The output 901 can be the sum of the optionally scaled outputs of the feature-based loss function 800 and the other metrics 902, for example.

The feature-based loss function 800 and the blended loss function 900 can be used for training other machine learning models, such as other learned image compression models, learned super-resolution models, etc. Furthermore, the outputs of the feature-based loss function 800 and the blended loss function 900 can be used as a metric to compare models.

Figure 10:
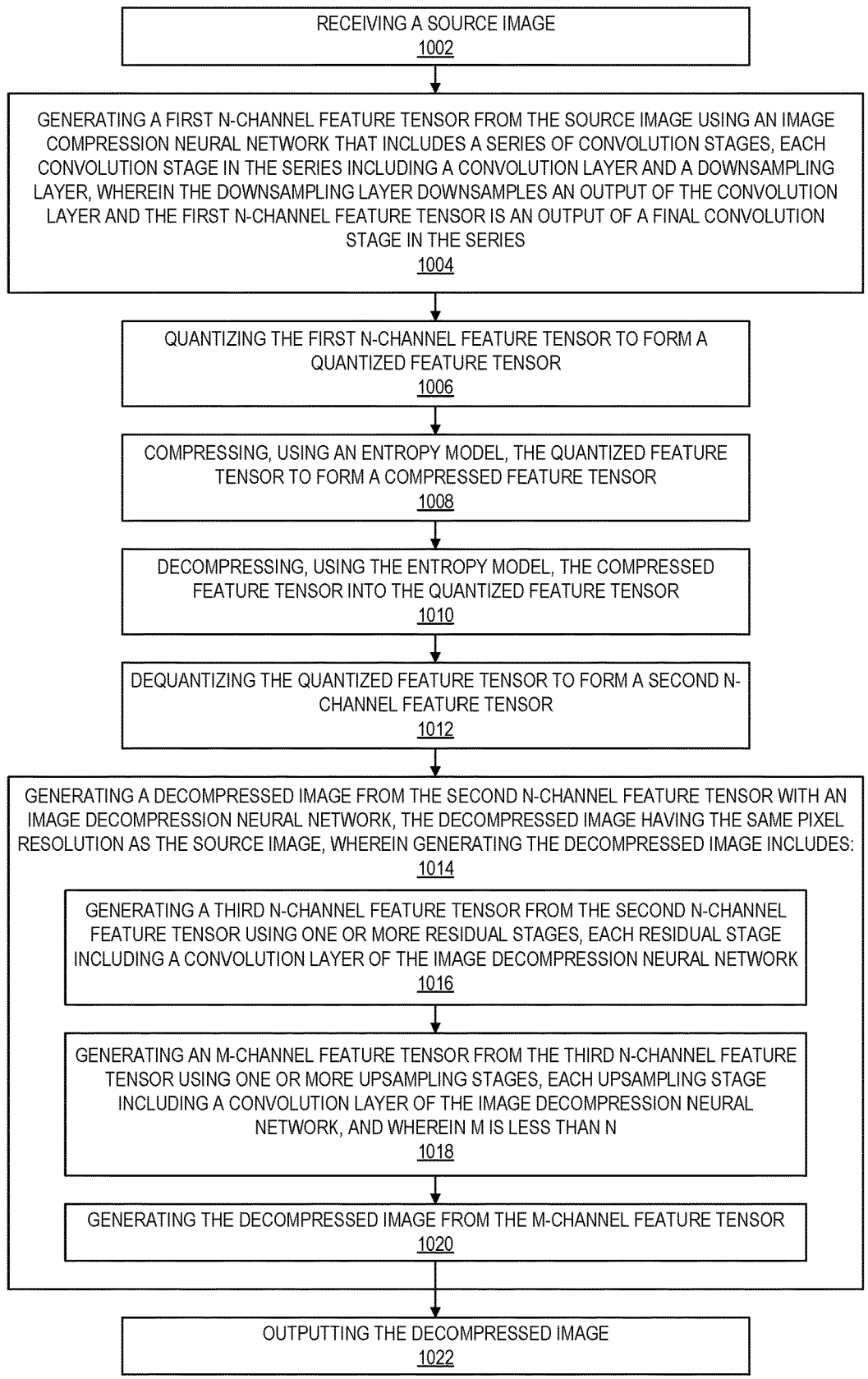
FIG. 10 is a flowchart conceptually illustrating an example method for encoding and decoding using the image compression model according to some embodiments of the present disclosure.

FIG. 10 is a flowchart conceptually illustrating an example method for encoding and decoding using the image compression model according to some embodiments of the present disclosure. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by a computer system (e.g., the computer systems 190, 191, 1100 of the other figures). While some examples of each of the operations are provided below, other examples of the operations are provided herein.

The operations include, at block 1002, receiving a source image. For example, a computer system can receive or otherwise obtain a source image from memory or across network. Such an image may be in an uncompressed format.

The operations further include, at block 1004, generating a first N-channel feature tensor from the source image using an image compression neural network that includes a series of convolution stages, each convolution stage in the series including a convolution layer and a downsampling layer, wherein the downsampling layer downsamples an output of the convolution layer and the first N-channel feature tensor is an output of a final convolution stage in the series. For example, the computer system can implement an encoder such as the feature encoder 105 described herein to transform the received image into a feature tensor.

The operations further include, at block 1006, quantizing the first N-channel feature tensor to form a quantized feature tensor. For example, the computer system can implement a quantizer to perform quantization of the feature tensor per the quantization 220 process described herein.

The operations further include, at block 1008, compressing, using an entropy model, the quantized feature tensor to form a compressed feature tensor. For example, the computer system can implement an entropy encoder to encode the quantized feature tensor according to an entropy model process described herein, such as per the entropy encoding 225 process described herein. The compressed feature tensor can be stored in a memory device at reduced storage cost or transmitted to another computer system at reduced transmission cost relative to traditional image compression formats.

The operations further include, at block 1010, decompressing, using the entropy model, the compressed feature tensor into the quantized feature tensor. For example, sometime later the image may need to be reconstructed from the compressed feature tensor for display. The computer system or the other computer system can receive or otherwise obtain (e.g., from a memory device or network interface) the compressed feature tensor. Using the entropy model, the computer system can recover the quantized feature tensor such as via the entropy decoding 401 process described herein.

The operations further include, at block 1012, dequantizing the quantized feature tensor to form a second N-channel feature tensor. For example, the computer system can implement a dequantizer or inverse quantizer to perform dequantization or inverse quantization of the quantized feature tensor per the dequantization 402 process described herein.

The operations further include, at block 1014, generating a decompressed image from the second N-channel feature tensor with an image decompression neural network, the decompressed image having the same pixel resolution as the source image. For example, the computer system can implement a decoder such as the feature decoder 120 described herein to reconstruct the image from the feature tensor. Note that in some embodiments, the total number of values that represent the image in the feature tensor is less than the total number of values that represented the source image (e.g., a source image having 196,608 values (e.g., a 256×256 pixel image having 3 color channels) and a feature tensor having 46,208 values (e.g., a 19×19×128 feature volume).

As part of generating the decompressed image, the operations further include, at block 1016, generating a third N-channel feature tensor from the second N-channel feature tensor using one or more residual stages, each residual stage including a convolution layer of the image decompression neural network. For example, the computer system can implement one or more residual stages 410 as described herein.

As part of generating the decompressed image, the operations further include, at block 1018, generating an M-channel feature tensor from the third N-channel feature tensor using one or more upsampling stages, each upsampling stage including a convolution layer of the image decompression neural network, and wherein M is less than N. For example, the computer system can implement one or more upsample stages 430 that reduce the number of channels in an output and increase the dimension of one or more of the height and width of an output as described herein.

As part of generating the decompressed image, the operations further include, at block 1020, generating the decompressed image from the M-channel feature tensor. For example, the computer system can process the M-channel feature tensor to form a pixel-based reconstructed image, such as by the convolution layer 435.

The operations further include, at block 1022, outputting the decompressed image. For example, the computer system may output the decompressed image on a display device, transmit or send the decompressed image to another computer system, encode the decompressed image into another format, etc. as described herein.

Figure 11:
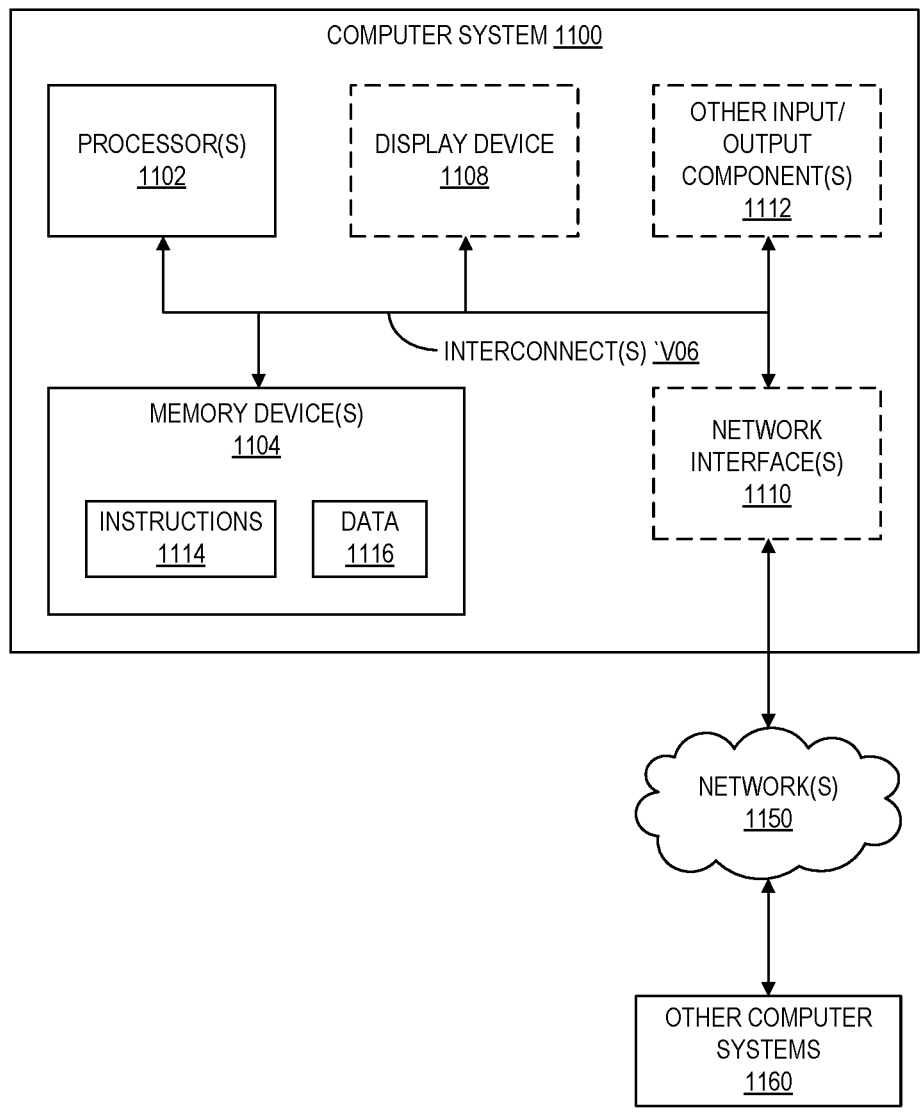
FIG. 11 is a block diagram illustrating an example computer system that may be used in some embodiments.

FIG. 11 is a block diagram illustrating an example computer system that may be used in some embodiments to implement a portion or all of the techniques for learned image compression as described herein. As illustrated, the computer system 1100 includes one or more processors 1102 coupled to one or more memory devices 1104 via one or more interconnects 1106. The computer system 1100 optionally includes display device(s) 1108, network interface(s) 1110, and/or other input/output ("I/O") components 1112. Exemplary computer systems can range from rack- or blade-servers deployed in cloud or distributed computing environments to workstations and personal computers to mobile devices such as laptops, tablets, and smart phones. Generally, a computer system 1100 can also be referred to as an electronic device.

In various embodiments, the computer system 1100 may be a uniprocessor system including one processor 1102 or a multiprocessor system including several processors 1102 (e.g., two, four, eight, or another suitable number). Processors 1102 may be any suitable processors capable of executing instructions (sometimes referred to as code). For example, in various embodiments, processors 1102 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1102 may commonly, but not necessarily, implement the same ISA. In some embodiments, one or more of the processors 1102 are special-purpose processors such as graphics accelerators or other custom application-specific integrated circuits that improve the performance of the training and/or inference techniques described herein.

In various embodiments, the computer system 1100 may include a combination of one or more memory devices 1104 of various types. The memory device(s) 1104 can store instructions 1114 and data 1116 accessible by the processor(s) 1102. Exemplary memory types include volatile memory devices (e.g., such as random-access memory ("RAM"), static RAM ("SRAM"), synchronous dynamic RAM ("SDRAM")) and non-volatile memory devices (e.g., Flash-based memory devices, magnetic-based memory devices such as disk drives, optical-based memory devices such as DVD). In the illustrated embodiment, program instructions and data implementing one or more desired functions, such as those methods, techniques, and data described above are shown stored within system memory 1104 as instructions 1114 and data 1116.

In some embodiments, the computer system 1110 includes one or more network interface(s) 1110 to allow the computer system 1100 to exchange instructions and or data with other computer systems 1160 via one or more networks 1150 (e.g., the Internet, a private intranet, etc.), such as between the computer systems illustrated in FIG. 1, for example. In various embodiments, network interface(s) 1110 may support communication via any suitable wired or wireless data networks, such as Ethernet-based networks, cellular networks, satellite networks, and the like, for example. As described above, the memory device(s) 1104 can store instructions 1114 and associated data 1116 for execution by the processor(s) 1102. However, in other embodiments, program instructions and/or data may be sent or received via the network interface(s) 1110.

In some embodiments, the computer system 1100 includes or is coupled to one or more display devices 1108 to convey information to a user (e.g., the display of an image). Exemplary display devices 1108 include light-emitting diode ("LED") displays and or liquid crystal displays ("LCD").

In some embodiments, the computer system 1100 includes one or more other I/O components 1112. The other I/O components 1112 can enable the computer system 1100 to receive input from a user. Exemplary I/O components 1112 include keyboards, touchscreens, push buttons, touch pads, wheel, joystick, mouse, keypad, microphones, cameras, and other sensors.

The coupling of the set of processors and other components is typically through one or more interconnects 1106 of the computer system 1100. The interconnect(s) 1106 coordinate I/O traffic between the other components of the computer system 1100. For example, the interconnects 1106 can perform any necessary protocol, timing or other data transformations to convert data signals from one component (e.g., a memory device 1104) into a format suitable for use by another component (e.g., a processor 1102). In some embodiments, the interconnect(s) 1106 may include support for devices attached through various types of peripheral buses, such as a variant of the Peripheral Component Interconnect (PCI) bus standard or the Universal Serial Bus (USB) standard, for example. In some embodiments, the interconnect(s) 1106 can include other interconnects such as QuickPath interconnect ("QPI") or UltraPath interconnect ("UPI"). In some embodiments, components may have dedicated interconnect(s) to other components (e.g., one or more processors 1102 with a dedicated interconnect to one or more memory devices 1104, for example).

As discussed, different approaches can be implemented in various environments in accordance with the described embodiments. FIGS. 12A-12B illustrate examples of environments for implementing some embodiments of the present disclosure. As illustrated in FIG. 12A, a provider network 1200 includes a web server 1206 and a data store 1210, each of which may be implemented by one or more electronic devices. The web server 1206 provides an interface to access compressed image data stored in the data store 1210. For example, a client computing system 1202 can send a request (e.g., an HTTP GET message) to the web server 1206 for a compressed image. The web server 1206 can fetch the requested compressed image data from a data store 1210 and send the compressed image data to the client computing system 1202. In an exemplary embodiment, the data store 1210 stores compressed image data as compressed feature data as disclosed herein, and the client computing system 1202 includes the decoder 400 to reconstruct the compressed image from the compressed feature data.

The client computing system 1202 can be any appropriate device operable to send and receive requests, messages or information over an appropriate network 1204 and convey information back to a user of the client computing system 1202. Examples of such client computing systems 1202 include personal computers (PCs), cell phones, handheld messaging devices, laptop computers, set-top boxes, personal data assistants, electronic book readers, wearable electronic devices (e.g., glasses, wristbands, monitors), and the like.

The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

The web server 1206 can handle requests and responses between the client device 1202 and other components of the provider network 1200, such as the data store 1210. As used herein the term "data store" refers to any device or combination of devices capable of storing, accessing and retrieving data, which may include any combination and number of data servers, databases, data storage devices and data storage media, in any standard, distributed or clustered environment.

As illustrated in FIG. 12B, a provider network 1250 includes a web server 1256, an application server 1258, and the data store 1210, each of which may be implemented by one or more electronic devices. As with the web server 1206, the web server 1256 provides an interface for other devices (e.g., a client computing system 1252) to access compressed image data stored as compressed feature data in the data store 1210, this time via the application server 1258. In this example, the client computing system 1252 may have the capability to display traditional compressed image formats (e.g., PNG, JPEG, GIF, SVG, etc.) as part of a browser application. The application server 1208 includes one or more transcoders to convert between feature-based compression formats and traditional raster- or vector-based compression formats. For example, the application server 1258 can implement a transcoder (not shown) that includes the decoder 400 to reconstruct an image from the compressed feature data stored in the data store 1210 and an encoder (not shown) to compress the reconstructed image into another format readable by the client computing system 1252. As another example, the application server 1258 can implement a transcoder (not shown) that includes a decoder (not shown) to reconstruct an image received from the client computing system 1252 and, with the encoder 200, compress the reconstructed image into compressed feature data for storage in the data store 1210.

In the example of converted from the compressed feature data to another format readable by the client computing system 1252, the application server 1258 can receive a message from the web server 1256 that includes an identifier of the requested image (e.g., a filename with a particular file format extension). The application server 1258 can identify the corresponding file in the compressed feature data format using the identifier (e.g., a request for "x.jpeg" corresponds to "x.cft" where .cft is a compressed feature tensor extension). The application server 1258 can transcode the compressed feature data into the requested format and return the transcoded data to the web server 1256.

As will be appreciated, although a web-based environments of FIGS. 12A and 12B are used for purposes of explanation, different environments may be used, as appropriate, to implement various embodiments. For example, the client issuing requests for compressed image data may be part of the provider networks 1200, 1250. As another example, one or more intermediate servers or services may reside between the illustrated components of FIGS. 12A and 12B. Thus, the depiction of the environments in FIGS. 12A and 12B should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 902A-902N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a source image;
   generating a first N-channel feature tensor from the source image using an image compression neural network that includes a series of convolution stages, each convolution stage in the series including a convolution layer and a downsampling layer, wherein the downsampling layer downsamples an output of the convolution layer and the first N-channel feature tensor is an output of a final convolution stage in the series;
   quantizing the first N-channel feature tensor to form a quantized feature tensor;
   compressing, using an entropy model, the quantized feature tensor to form a compressed feature tensor;
   decompressing, using the entropy model, the compressed feature tensor into the quantized feature tensor;
   dequantizing the quantized feature tensor to form a second N-channel feature tensor;
   generating a decompressed image from the second N-channel feature tensor with an image decompression neural network, the decompressed image having the same pixel resolution as the source image, wherein generating the decompressed image includes:
      generating a third N-channel feature tensor from the second N-channel feature tensor using one or more residual stages, each residual stage including a convolution layer of the image decompression neural network,
      generating an M-channel feature tensor from the third N-channel feature tensor using one or more upsampling stages, each upsampling stage including a convolution layer of the image decompression neural network, and wherein M is less than N, and
      generating the decompressed image from the M-channel feature tensor; and
   outputting the decompressed image.

2. The computer-implemented method of claim 1, wherein:
   at least one of the one or more residual stages receives an input N-channel feature tensor and generates an output N-channel feature tensor; and
   the output N-channel feature tensor is an element-wise sum of the input N-channel feature tensor with an output of a convolution of the input N-channel feature tensor.

3. The computer-implemented method of claim 1, wherein:
   at least one of the one or more upsampling stages receives an input feature tensor and generates an output feature tensor by shuffling values of a plurality of channels of the input feature tensor into a single channel of the output feature tensor; and
   the input feature tensor has a particular dimension and the output feature tensor has a corresponding dimension that is greater than the particular dimension.

4. A computer-implemented method comprising:
   receiving compressed image data that includes a first N-channel feature tensor representing a source image;
   generating a decompressed image from the first N-channel feature tensor with an image decompression neural network, the decompressed image having the same resolution as the source image, wherein generating the decompressed image includes:
      generating a second N-channel feature tensor from the first N-channel feature tensor using one or more residual stages, each residual stage including a convolution layer of the image decompression neural network,
      generating an M-channel feature tensor from the second N-channel feature tensor using one or more upsampling stages, each upsampling stage including a convolution layer of the image decompression neural network, and wherein M is less than N, and
      generating the decompressed image from the M-channel feature tensor; and
   outputting the decompressed image.

5. The computer-implemented method of claim 4, wherein:
   at least one of the one or more residual stages receives an input N-channel feature tensor and generates an output N-channel feature tensor; and
   the output N-channel feature tensor is an element-wise sum of the input N-channel feature tensor with an output of a convolution of the input N-channel feature tensor.

6. The computer-implemented method of claim 4, wherein:
   at least one of the one or more upsampling stages receives an input feature tensor and generates an output feature tensor by shuffling values of a plurality of channels of the input feature tensor into a single channel of the output feature tensor; and
   the input feature tensor has a particular dimension and the output feature tensor has a corresponding dimension that is greater than the particular dimension.

7. The computer-implemented method of claim 4, wherein the one or more residual stages includes a series of residual stages from an initial residual stage to a final residual stage, the method further comprising:
   generating, with a first convolution layer, an input feature tensor to the initial residual stage from the first N-channel feature tensor; and
   generating, with a second convolution layer, a third N-channel feature tensor from an output feature tensor of the final residual stage, wherein the second N-channel feature tensor is an element-wise sum of the input feature tensor with the third N-channel feature tensor.

8. The computer-implemented method of claim 4, wherein the first N-channel feature tensor is included in the compressed image data as a compressed feature tensor, and the method further comprising:
   decompressing, using an entropy model, the compressed feature tensor to form a quantized feature tensor; and
   dequantizing the quantized feature tensor to form the first N-channel feature tensor.

9. The computer-implemented method of claim 8, further comprising:
receiving the source image;
generating a third N-channel feature tensor from the source image using an image compression neural network that includes a series of convolution stages, each convolution stage in the series including a convolution layer and a downsampling layer, wherein the downsampling layer downsamples an output of the convolution layer and the third N-channel feature tensor is an output of a final convolution stage in the series;
quantizing, using a quantizer, the third N-channel feature tensor to form the quantized feature tensor; and
compressing, using the entropy model, the quantized feature tensor to form the compressed feature tensor.

10. The computer-implemented method of claim 9, further comprising training at least one parameter of each of the convolution layer of each convolution stage, the quantizer, the entropy model, the convolution layer of each residual stage, and the convolution layer of each upsampling stage.

11. The computer-implemented method of claim 10, wherein the training comprises:
generating, using a first layer of a pre-trained neural network model, a first feature tensor from the source image;
generating, using the first layer of the pre-trained neural network model, a second feature tensor from the decompressed image;
generating a first metric based in part on the first feature tensor and the second feature tensor;
generating, using a second layer of the pre-trained neural network model, a third feature tensor from the source image;
generating, using the second layer of the pre-trained neural network model, a fourth feature tensor from the decompressed image;
generating a second metric based in part on the third feature tensor and the fourth feature tensor;
generating an error based in part on the first metric and the second metric; and
updating, based on the error, the at least one parameter of each of the convolution layer of each convolution stage, the quantizer, the entropy model, the convolution layer of each residual stage, and the convolution layer of each upsampling stage.

12. The computer-implemented method of claim 11, wherein the error is further based on a third metric generated by a region-based comparison between the source image and the decompressed image.

13. A system comprising:
a data store implemented by a first one or more electronic devices, the data store to store a plurality of compressed image files in a first compression format; and
a transcoder service implemented by a second one or more electronic devices, the transcoder service including instructions that upon execution cause the transcoder service to:
receive a request from a client electronic device for a first compressed image file in a second compression format;
obtain a second compressed image file in the first compression format from the data store, wherein the second compressed image file corresponds to the first compressed image file and includes a first N-channel feature tensor representing a source image;
generate a second N-channel feature tensor from the first N-channel feature tensor using one or more residual stages, each residual stage including a convolution layer of an image decompression neural network,
generate an M-channel feature tensor from the second N-channel feature tensor using one or more upsampling stages, each upsampling stage including a convolution layer of the image decompression neural network, and wherein M is less than N, and
generate a decompressed image from the M-channel feature tensor, the decompressed image having the same resolution as the source image;
compress the decompressed image to form the first compressed image file; and
send the first compressed image file to the client electronic device.

14. The system of claim 13, wherein:
at least one of the one or more residual stages receives an input N-channel feature tensor and generates an output N-channel feature tensor; and
the output N-channel feature tensor is an element-wise sum of the input N-channel feature tensor with an output of a convolution of the input N-channel feature tensor.

15. The system of claim 13, wherein:
at least one of the one or more upsampling stages receives an input feature tensor and generates an output feature tensor by shuffling values of a plurality of channels of the input feature tensor into a single channel of the output feature tensor; and
the input feature tensor has a particular dimension and the output feature tensor has a corresponding dimension that is greater than the particular dimension.

16. The system of claim 13, wherein the one or more residual stages includes a series of residual stages from an initial residual stage to a final residual stage, the transcoder service including further instructions that upon execution cause the transcoder service to:
generate, with a first convolution layer, an input feature tensor to the initial residual stage from the first N-channel feature tensor; and
generate, with a second convolution layer, a third N-channel feature tensor from an output feature tensor of the final residual stage, wherein the second N-channel feature tensor is an element-wise sum of the input feature tensor with the third N-channel feature tensor.

17. The system of claim 13, wherein the first N-channel feature tensor is included in the second compressed image file as a compressed feature tensor, the transcoder service including further instructions that upon execution cause the transcoder service to:
decompress, using an entropy model, the compressed feature tensor to form a quantized feature tensor; and
dequantize the quantized feature tensor to form the first N-channel feature tensor.

18. The system of claim 13, wherein each residual stage includes the convolution layer, an activation layer, and another convolution layer of the image decompression neural network.

19. The system of claim 13, wherein the decompressed image is an output of a convolution of the M-channel feature tensor.

20. The system of claim 13, wherein the second compression format is at least one of a raster-based format or a vector-based format.

* * * * *